(12) United States Patent
Vannoni et al.

(10) Patent No.: US 11,544,586 B2
(45) Date of Patent: Jan. 3, 2023

(54) DETECTING INCORRECT FIELD VALUES OF USER SUBMISSIONS USING MACHINE LEARNING TECHNIQUES

(71) Applicant: PayPal, Inc., San Jose, CA (US)

(72) Inventors: Gregory Anthony Vannoni, Phoenix, AZ (US); Jonathan S. Arney, Phoenix, AZ (US); Yifan Liu, Foster City, CA (US); Haiou Wang, Newark, CA (US); Sree Ramakumar Velaga, Phoenix, AZ (US)

(73) Assignee: PayPal, Inc., San Jose, CA (US)

( * ) Notice: Subject to any disclaimer, the term of this patent is extended or adjusted under 35 U.S.C. 154(b) by 1071 days.

(21) Appl. No.: 16/205,162

(22) Filed: Nov. 29, 2018

(65) Prior Publication Data

US 2020/0175391 A1 Jun. 4, 2020

(51) Int. Cl.
*G06N 3/08* (2006.01)
*G06N 5/04* (2006.01)
(Continued)

(52) U.S. Cl.
CPC ............... *G06N 5/04* (2013.01); *G06F 16/22* (2019.01); *G06N 3/08* (2013.01); *G06N 20/00* (2019.01)

(58) Field of Classification Search
CPC ............ G06N 5/04; G06N 3/08; G06N 20/00; G06N 7/005; G06N 20/10; G06N 3/0454; G06N 5/003; G06N 20/20; G06F 16/22
See application file for complete search history.

(56) References Cited

U.S. PATENT DOCUMENTS

| 7,970,766 B1 * | 6/2011 | Shamsi | ................. G06F 16/288 |
| | | | 707/803 |
| 8,244,651 B1 * | 8/2012 | Lin | ........................ G06N 20/00 |
| | | | 706/14 |

(Continued)

OTHER PUBLICATIONS

Pandey, et al., "Automated Classification of Software Issue Reports Using Machine Learning Techniques: An Empirical Study," Mar. 19, 2017, 18 pages.

*Primary Examiner* — Stephen S Hong
*Assistant Examiner* — Ahamed I Nazar
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to detecting one or more incorrect fields in user submissions, using machine learning techniques. A corrective system may access information for a plurality of fields of a tracking data structure for a user submission. In some embodiments, the corrective system predicts correct values for multiple fields of the tracking data structure using a plurality of respective different machine learning classifier modules. In some embodiments, the classifier modules use different sets of the plurality of fields as inputs and the multiple fields include a priority of the user submission and an assignee for the user submission. In some embodiments, in response to determining that at least one of the predicted correct values does not match a current value for a corresponding field of the tracking data structure, the computing system stores information indicating the mismatch and may automatically correct one or more fields.

20 Claims, 8 Drawing Sheets

(51) Int. Cl.
    *G06N 20/00*    (2019.01)
    *G06N 20/10*    (2019.01)
    *G06N 20/20*    (2019.01)
    *G06F 16/22*    (2019.01)

(56) References Cited

U.S. PATENT DOCUMENTS

| | | | | |
|---|---|---|---|---|
| 9,104,914 | B1* | 8/2015 | Vincent | G06V 40/161 |
| 2005/0257134 | A1* | 11/2005 | Goodman | G06F 40/174 |
| | | | | 706/12 |
| 2007/0005337 | A1 | 1/2007 | Mount et al. | |
| 2008/0126887 | A1* | 5/2008 | Brodeur | G06F 11/0748 |
| | | | | 714/57 |
| 2009/0276381 | A1* | 11/2009 | Boies | G06N 5/022 |
| | | | | 706/54 |
| 2010/0179930 | A1* | 7/2010 | Teller | G06N 20/00 |
| | | | | 706/12 |
| 2012/0254181 | A1* | 10/2012 | Schofield | G06Q 10/107 |
| | | | | 707/E17.046 |
| 2014/0372346 | A1* | 12/2014 | Phillipps | G06N 20/00 |
| | | | | 706/12 |
| 2017/0278421 | A1* | 9/2017 | Du | G09B 7/02 |
| 2017/0357627 | A1* | 12/2017 | Peterson | G06F 3/0488 |
| 2018/0046939 | A1 | 2/2018 | Meron et al. | |
| 2018/0107944 | A1 | 4/2018 | Lin et al. | |
| 2018/0322418 | A1* | 11/2018 | Jayaraman | G06N 7/005 |

\* cited by examiner

DETECTING INCORRECT FIELD VALUES OF USER SUBMISSIONS USING MACHINE LEARNING TECHNIQUES

BACKGROUND

Technical Field

This disclosure relates generally to tracking user submissions and more specifically to using machine learning classifiers to identify incorrect values in fields of user submissions.

DESCRIPTION OF THE RELATED ART

Tracking systems may track various types of user submissions, including issues, tasks, improvements, etc. One or more incorrect fields in a user submission may cause delays in processing the submission, increasing the time to resolve the submission. In systems that track large numbers of submissions, for example, submissions with incorrect fields may be lost for long periods before being addressed.

As one example, submissions relating to bugs that are mischaracterized as some other type of submission (e.g., as suggested improvements) may be delayed because the assignee does not prioritize the other types of submissions as highly. As another example, an incorrect priority field may similarly delay resolution by the assignee. As yet another example, an incorrect assignee for a submission may require re-assignment to the correct assignee, which may cause substantial delay if the original incorrect assignee does not notice the problem.

Figure 1:
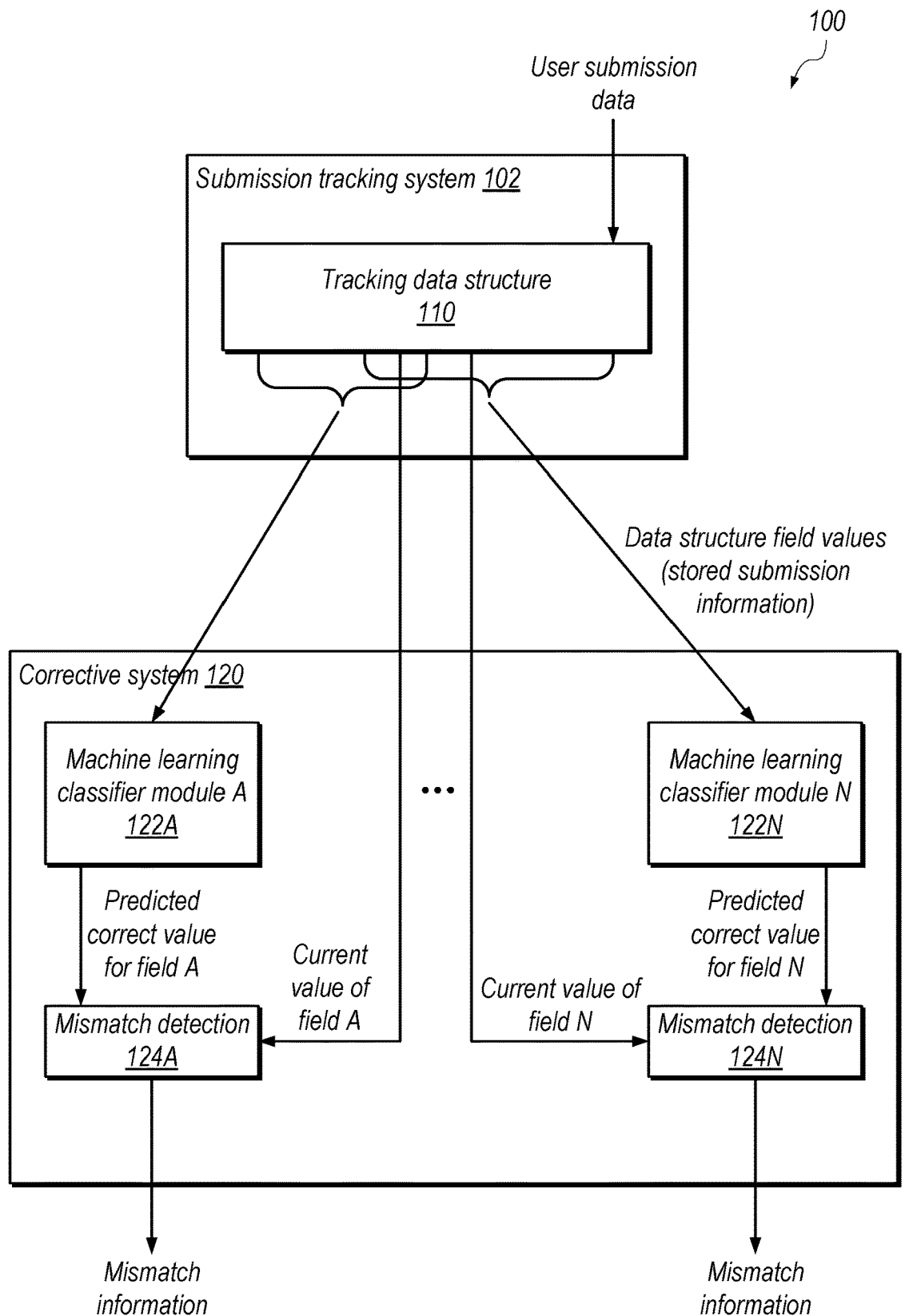
FIG. 1 is a block diagram illustrating an example corrective system for detecting a mismatch between user submission values stored in a tracking data structure and predicted correct values for the tracking data structure, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "corrective system configured to predict one or more correct values for one or more fields of a tracking data structure" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for identifying incorrect field values in user submissions using one or more machine learning classifier modules. Incorrect field values may cause substantial delay for certain types of user submissions. For example, if a user submission for a bug is mischaracterized as some other type of submission (such as a suggestion or improvement), it may not be resolved quickly. Similarly, mistakes in priority fields or in the entity assigned to handle the submission may delay resolution. Disclosed techniques for predicting correct field values may advantageously reduce the time to resolution (TTR), which in turn may improve user experience and computer security.

In disclosed techniques, values of a user submission are stored in fields of a tracking data structure. In disclosed techniques, one or more of the machine learning classifier modules are used to predict correct values for one or more of the fields. In disclosed techniques, predicted values are compared with stored values to generate mismatch information, which may be used to update one or more incorrect field values.

Overview of a Tracking System and Corrective System

FIG. 1 is a block diagram illustrating an example corrective system for detecting incorrect field values stored in a tracking data structure, according to some embodiments. In the illustrated embodiment, a computing system 100 includes a submission tracking system 102 and a corrective system 120. In some embodiments, tracking system 102 implements a tracking framework such as Jira, although various other systems are also contemplated. Systems 102 and 120 may be implemented using the same computing system or devices or different systems or devices. In the illustrated embodiment, corrective system 120 includes multiple machine learning classifier modules 122A-122N and corresponding mismatch detection modules 124A-124N.

Submission tracking system 102, in the illustrated embodiment, stores user submission data (e.g., field values of a user submission) in one or more fields of a tracking data structure 110. In some embodiments, system 102 implements a separate tracking data structure 110 for each user submission. Example fields of the tracking data structure that may be used as inputs to machine learning classifiers are discussed below with reference to FIGS. 4-6.

In some embodiments, tracking data structure fields include one or more of the following: priority, assignee, classification, number of attachments, number of comments, number of labels, number of users, environment, contact method, sub-product line, country, project, create time, reporter, summary, description, comments, number of assignments to the user associated with the submission, number of contacts, product, title, attachments, steps to reproduce, previous submissions, etc. Note that this list of inputs is included for purposes of illustration, but is not exhaustive and is not intended to limit the scope of the present disclosure.

Fields in tracking data structure 110 may be entered incorrectly initially (e.g., before submission of an issue) or may be incorrectly changed between submission and resolution of the issue.

Corrective system 120, in the illustrated embodiment, accesses different sets of one or more fields of the tracking data structure and provides the different sets to different machine learning classifier modules 122A-122N. Examples of classifiers include a classification classifier (e.g., to determine whether a submission should be a bug or non-bug), a priority classifier, and an assignee classifier, as discussed in detail below. In the illustrated embodiment, some of the types of field values in the different sets are overlapping (e.g., contain one or more of the same types of field values). In other embodiments, the sets may be non-overlapping such that the sets do not include any of the same fields.

Machine learning classifier module A 122A, in the illustrated embodiment, predicts a correct value for field A of the tracking data structure. In the illustrated embodiment, mismatch detection module 124A generates mismatch information based on the predicted correct value for field A of the tracking data structure and the current value stored in field A of the tracking data structure. The mismatch information may indicate a match or a mismatch between these values. In some embodiments, the mismatch information is a signal that is asserted only when there is a mismatch. In the illustrated embodiment, the other machine learning modules and mismatch detectors perform similar operations for other fields of the tracking data structure.

Note that, in some embodiments, all or a portion of submissions stored in tracking data structure 110 are computer-generated (e.g., one or more issues may be discovered by a computing device rather than a user). Thus, the present disclosure is not limited to tracking submissions by human users. In various embodiments a user or computing system may not enter inputs for all fields of the submission (e.g., not all corresponding fields in the tracking data structure will be filled). In some embodiments, one or more input fields of the user submission are filled with a default value when left empty.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Example Machine Learning Classifier Modules

Figure 2:
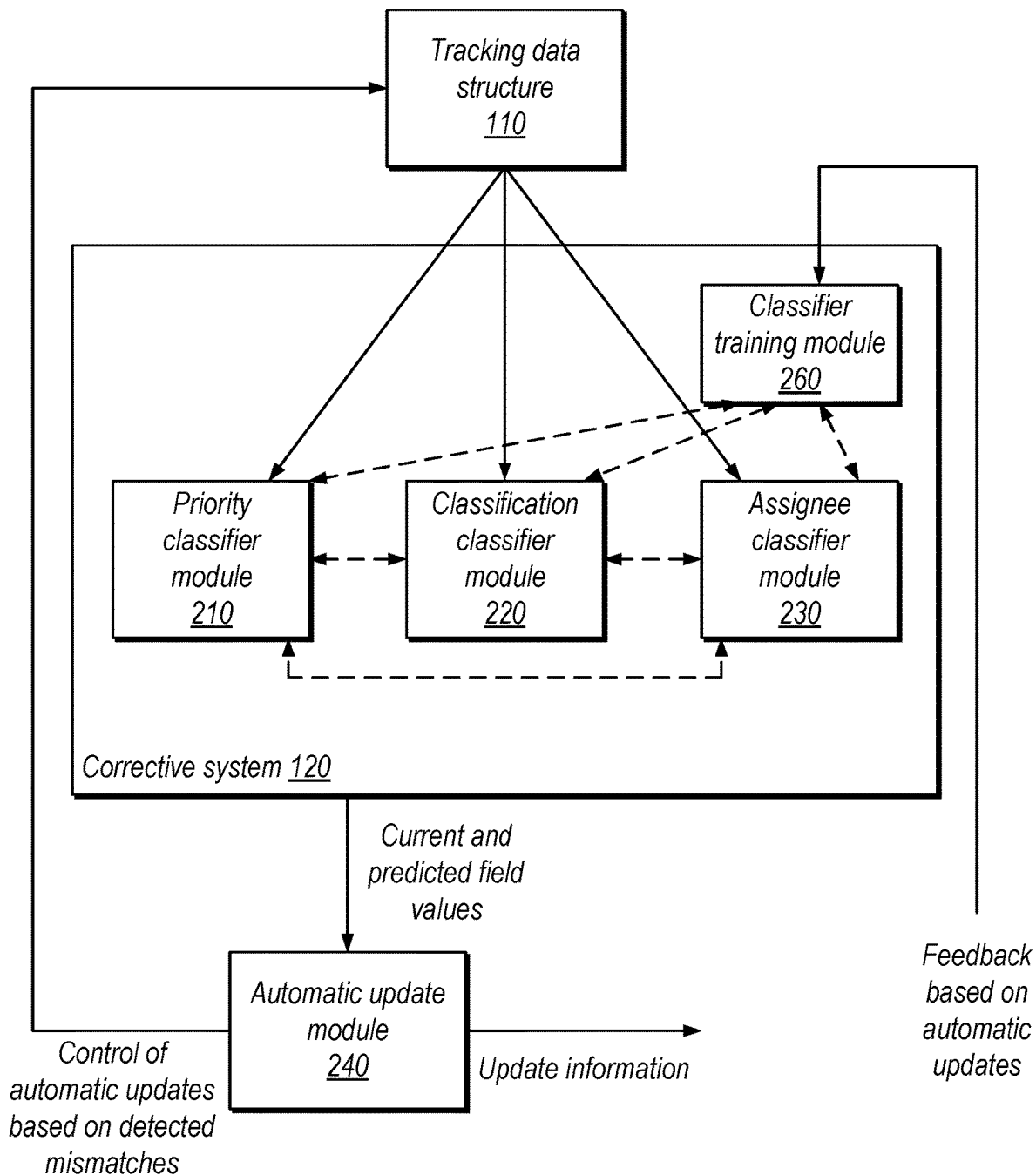
FIG. 2 is a block diagram illustrating three example machine learning classifier modules for predicting correct values for user submissions, according to some embodiments.

FIG. 2 is a block diagram illustrating three example machine learning classifier modules for predicting correct values for user submissions, according to some embodiments. In the illustrated embodiment, corrective system 120 includes priority classifier module 210, classification classifier 220, assignee classifier module 230, and classifier training module 260.

In the illustrated embodiment, priority classifier module 210, classification classifier module 220, and assignee classifier module 230 predict correct priority, classification, and assignee values for fields of tracking data structure 110, respectively. Specific example inputs, pre-processing, and algorithms for these modules are discussed in detail below with reference to FIGS. 4-6. In some embodiments, one or more of modules 210-230 communicate to generate these predictions (e.g., as shown by the dashed lines in FIG. 2). For example, the output of module 210 may be used by module 230 to predict an assignee value. In some embodiments, the outputs of two classifiers are combined to generate an overall report (e.g., a combined result that indicates whether one or more potentially-incorrect fields were identified). Note that the three classifier modules shown in the illustrated embodiment are included for purposes of illustration, but are not intended to limit the scope of the present disclosure. For example, classifier modules may be omitted, combined with other types of classifiers, combined in various numbers, etc.

Note that, in some embodiments, a classifier module may output a set of multiple potentially-correct field values for a field of tracking data structure 110. For example, module 210 may output three priority values and corrective system 120 may signal a mismatch only if the actual field value does not match any of the three values. In some embodiments, a classifier module may also output confidence values for respective values in the output set (e.g., 30% confidence for one value and 60% confidence for another), which may be considered in determining whether to flag a mismatch.

In some example embodiments, the output of priority classifier module 210 is one or more of the priority values P0 through P4, where P0 is the highest possible priority and P4 is the lowest possible priority that may be assigned to a submission. In some example embodiments, the output of the classification classifier module 220 is one or more of the following classification types: bug, task, subtask, new feature, improvement, story, etc. In some embodiments, the output of assignee classifier module 230 is information indicating an entity to which the user submission should be assigned. Examples of assignees include the following: individuals, project teams, business teams, predetermined groups (e.g., vice presidents, executives, etc.), etc. In the illustrated embodiment, corrective system 120 outputs current and predicted field values for the tracking data structure 110 based on one or more outputs of modules 210-230.

Automatic update module 240, in the illustrated embodiment, is configured to automatically update one or more fields of tracking data structure 110. For example, module 240 may implement logic to conditionally update fields to the predicted-correct value when a mismatch is detected. As one particular example of such logic, module 240 may change the field if it has greater than a threshold confidence level in the prediction from a classifier (in embodiments with classifiers that provide confidence levels) and the prediction is different than the current value of the field. As specific examples of field changes, module 240 may change a submission classification from a non-bug type to a bug, alter the priority field of a submission, or change an assignee of the submission. In the illustrated embodiment, module 240 also outputs update information. For example, the automatic update module 240 may send a communication (such as an email) to one or more users as a notification regarding one or more automatic updates.

In the illustrated embodiment, feedback based on update information is sent to classifier training module 260. This feedback may be generated explicitly by one or more users or implied based on user activity. In explicit embodiments, for example, one or more users may complete a survey based on the updates. In implied embodiments, for example, if users change the values of one or more fields updated by automatic update module 240 back to the original values or to some other value, this may be implied feedback that the automatic update to the field was incorrect.

Classifier training module 260, in the illustrated embodiment, trains classifier modules 210-230 using training data (e.g., based on information stored in one or more fields of tracking data structure 110 for which correct field values are known for relevant fields). In the illustrated embodiment, classifier training module 260 trains one or more classifier modules based on the feedback associated with automatic updates.

Overview of Machine Learning Classifier Training Techniques

Figure 3:
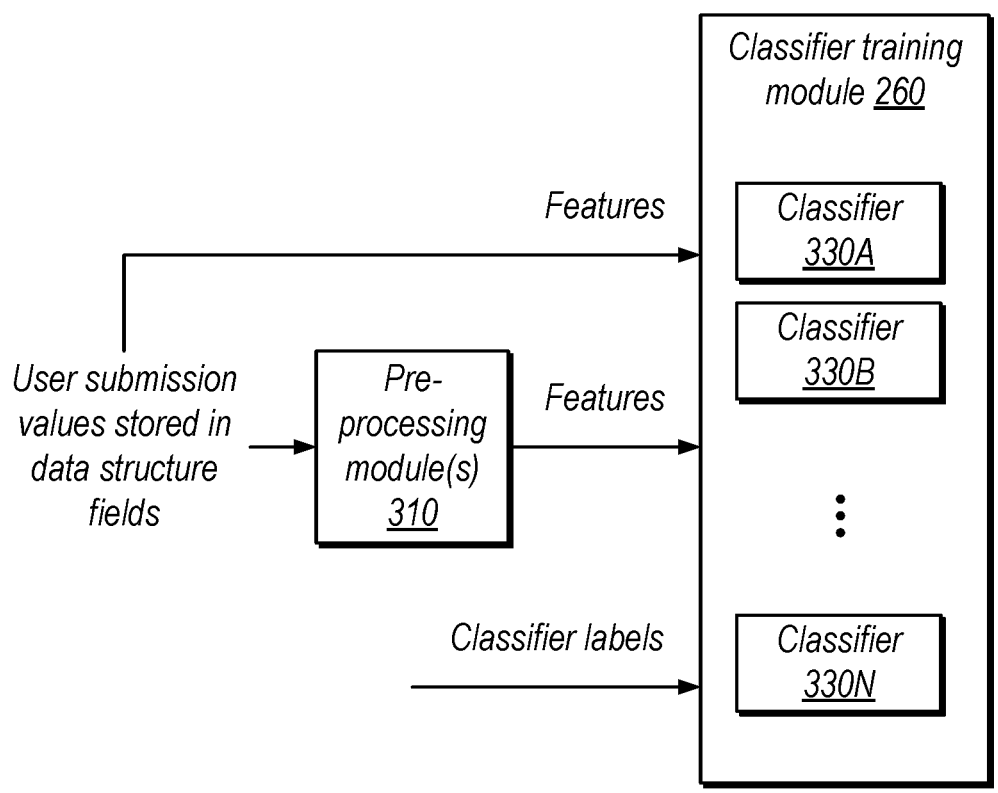
FIG. 3 is a block diagram illustrating an overview of training of machine learning classifiers, according to some embodiments.

FIG. 3 is a block diagram illustrating example training of machine learning classifiers, according to some embodiments. In the illustrated embodiment, classifier training module 260 trains one or more of classifiers 330A-330N.

In the illustrated embodiment, module 260 receives features and labels. Features are individually measurable properties of observed phenomena which are used as inputs to machine learning models. Features are typically represented as vectors. Labels are used to provide information (e.g., known correct field values) for training data, and are used to train module 260 to generate labels for unlabeled input data, in some embodiments. In the illustrated embodiment, some fields of tracking data structure 110 are provided directly as features while other fields are pre-processed by one or more pre-processing module(s) 310.

Pre-processing module(s) 310, in the illustrated embodiment, perform pre-processing using one or more of various different techniques on user submission values stored in one or more fields of tracking data structure 110 to generate one or more features. In some embodiments, pre-processing modules 310 implement one or more of the following: standard scaling, encoding, percentage distribution, vectorization, similarity detection, etc. Various types of pre-processing modules are discussed in further detail below with reference to FIGS. 4-6.

As discussed above, in the illustrated embodiment, classifier labels are input to the classifier training module 260. In some embodiments, the labels include known correct field values for the fields to be predicted by the classifiers, e.g., known correct classification (such as bug or non-bug), known correct priority, or known correct assignee.

In some embodiments, one or more of the following machine learning techniques are used by classifier training module 260 to train one or more of the multiple different classifiers 330A-330N: multilayer perceptron, logistic regression, random forest, k-neighbors, gradient boosting, extreme gradient boosting, adaptive boosting, gradient boosting trees, extra trees, multinomial naïve Bayes, support vector machine, extreme tree, etc. In some embodiments, multiple different types of machine learning techniques are used to train multiple different versions of a classifier. In some embodiments, one of the multiple versions of the classifier is selected for predicting user submission values. In some embodiments, model stacking techniques are used to generate a combined classifier from the one or more outputs of the multiple versions of the classifier module. Note that any of various machine learning techniques may be used to train classifiers included in the priority, classification, and assignee classifier modules discussed above with reference to FIG. 2. Specific examples of classifiers are discussed below with reference to FIGS. 4-6.

As discussed above with reference to FIG. 2, corrective system 120 may include priority, classification, and assignee classifier modules. The following discussion provides detailed examples of inputs and pre-processing for these modules. The details are included for purposes of illustration, but are not intended to limit the scope of the present disclosure.

Example Priority Classifier Module

Figure 4:
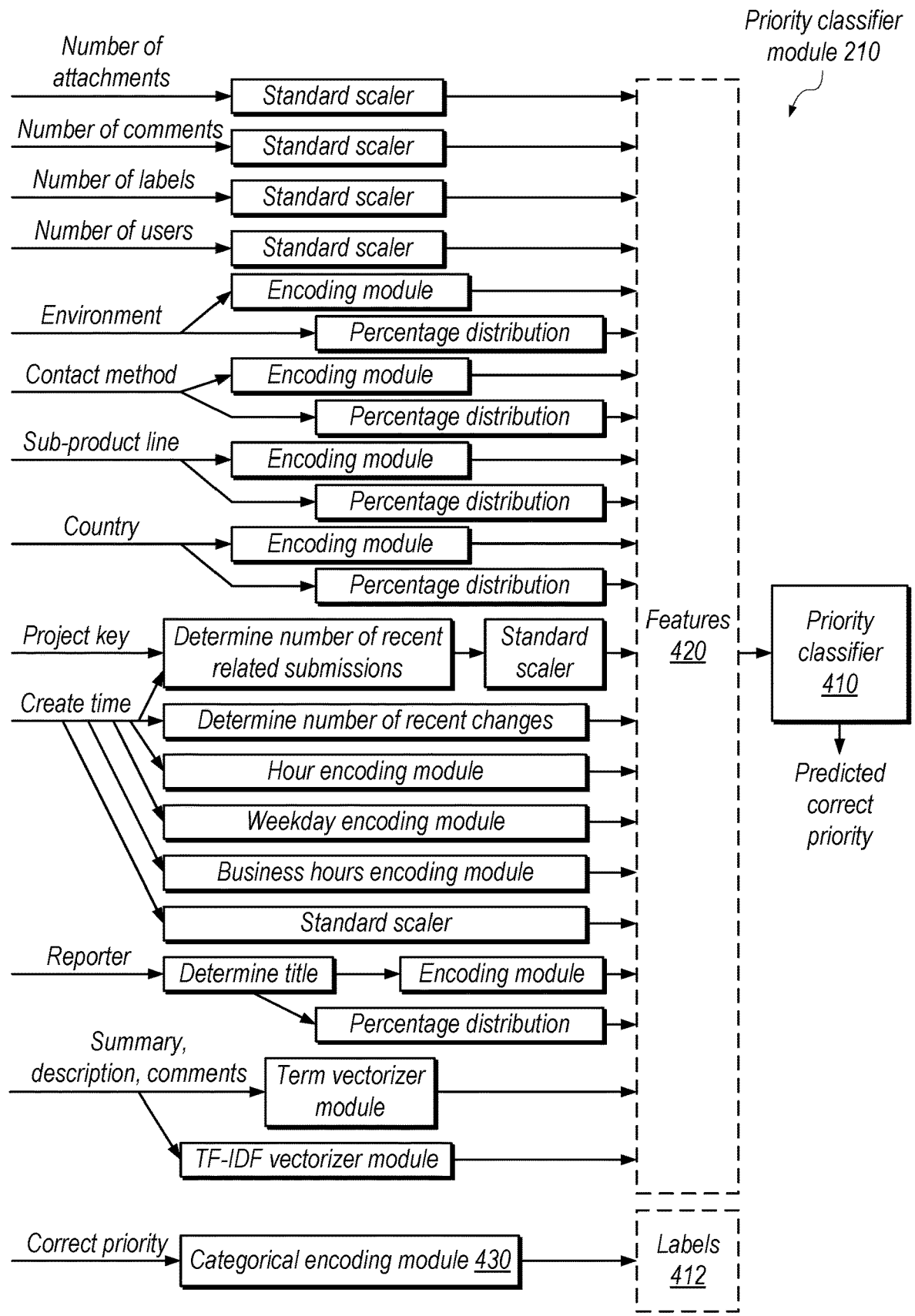
FIG. 4 is a block diagram illustrating example inputs and pre-processing for a classifier for a priority field, according to some embodiments.

FIG. 4 is a block diagram illustrating example inputs and pre-processing for a classifier for a priority field, according to some embodiments. In the illustrated embodiment, priority classifier module 210 includes priority classifier 410 and various pre-processing modules configured to process inputs to generate features 420 for classifier 410. FIG. 4 also shows a categorical encoding module 430, which generates labels 412. These labels may be based on known correct field values for training submissions used to train priority classifier 410, as discussed above with reference to FIG. 3.

User submission information is shown on the left-hand side of FIG. 4 as inputs to various pre-processing modules. In some embodiments, this information is obtained from tracking data structure 110. In training environments, information from various different user submissions is used by priority classifier module 210 in machine learning techniques to train priority classifier 410. In production environments, information from a particular user submission may be used to predict a correct priority value for that particular user submission.

In the illustrated embodiment, the input information includes the following: number of attachments, number of comments, number of labels, number of users, environment, contact method, sub-product line, country, project key, create time, reporter, summary, description, and comments. Note that this combination of inputs is included for purposes of illustration and may advantageously facilitate accurate prediction of a value for a priority field for certain data sets, but is not intended to limit the scope of the present disclosure. For example, other inputs may be added, inputs may be removed, etc. The following discussion provides additional details regarding the example inputs, grouped by type of pre-processing applied to the example inputs.

Standard scalers, in the illustrated embodiment, process the following inputs: number of attachments, number of comments, number of labels, and number of users. In some embodiments, a standard scaler module normalizes one or more inputs to achieve a standard normal distribution (e.g., scales input data to be centered around 0 and have a standard deviation of 1). In some embodiments, the standard scaler avoids certain inputs having outsized effects on the classifier relative to other inputs that typically have lower values, for example. In some embodiments, feature scaling techniques other than standard scalers (e.g., a min-max scaler, a robust scaler, etc.) may be used to scale any of various user submission information.

In some embodiments, the number of attachments represents the total amount of objects (e.g., text documents, files, portable document format (PDFs), image files, etc.) that are attached to the user submission. In some embodiments, the number of comments represents the total amount of comments submitted with the user submission (e.g., comments from the user generating the submission, other users associated with the submission, etc.). In some embodiments, the number of labels represents a total amount of labels included with the user submission. Note that these labels are not to be confused with labels used in machine learning training. In some embodiments, the label field of a user submission may be used to indicate one or more descriptive values associated with the submission (e.g., project name, project key, release version, etc.). In some embodiments, labels associated with a user submission are user-selectable to view one or more other related user submissions that also have the same label. In some embodiments, the number of users is the total amount of users associated with the submission. For example, this may include users that are watching the user submission, have viewed the user submission, are tagged in the user submission, etc.

The encoding modules, in the illustrated embodiment, process the following inputs: environment, contact method, sub-product line, and country in which the submission originated. The encoding modules shown in the illustrated embodiment may perform various different encoding techniques, including one or more of the following: one-hot encoding, binary encoding, ordinal encoding, etc. One-hot encoding may represent one or more categorical inputs as binary vectors, for example.

In some embodiments, an environment includes one or more of the following: development, stage, integration, production, etc. In some embodiments, the environment includes one or more coding environments relating to the submission, including: Java, C++, C#, JavaScript, Python, or one or more operating environments such as an operating system, etc. In some embodiments, the method used to submit the submission includes one or more of the following mediums: direct to Jira, email, slack, phone, instant messaging, etc. In some embodiments, a sub-product line includes a smaller category of products within a larger category of products.

In the illustrated embodiment, percentage distribution modules process the following inputs: environment, contact method, sub-product line and country in which the submission originated (the same inputs processed by the encoding modules). In some embodiments, a percentage distribution module calculates the total number of elements within a particular class of input. For example, the percentage distribution of user submissions in a set of user submissions that are associated with a particular environment (e.g., stage) may be 30%. Note that the determined distribution may be in various ratio formats, percentages are discussed for purposes of illustration, but are not intended to limit the scope of the present disclosure.

In the illustrated embodiment, a pre-processing module determines a number of recent submissions related to the user submission based on a project key and a create time of the user submission. For example, recent submissions may include submissions entered three days or less prior to the user submission. In some embodiments, related submissions include submissions with a similar and/or the same project key and/or creation time as the user submission. In some embodiments, a number of failed customer interactions (FCI) for a given group that are submitted within a time interval prior to the user submission is determined using the project key and the creation time of the user submission. In some embodiments, a standard scaler module processes the determined number of recent related submissions and the number of FCI's for a given team to generate a feature.

In the illustrated embodiment, various pre-processing modules perform the following operations on the create time of the user submission: determine number of recent changes, encode hour, encode weekday, encode whether the submission occurred during business hours, and perform standard scaling. Encoding outputs of these operations may provide vectors for use as features to the classifier. In some embodiments, the create time of the user submission is used to determine a number of recent changes (e.g., a number of releases and/or rollbacks to software associated with the submission in the last three days).

In the illustrated embodiment, a title module processes the reporter of the user submission to determine the job title of the reporter (e.g., junior developer, vice president of operations, vice president of research and development, customer service representative, etc.). In the illustrated embodiment, an encoding module processes the output of the title module. In the illustrated embodiment, a percentage distribution module also processes the output of the title module.

In the illustrated embodiment, a term vectorizer module processes the summary, description, and comments associated with the user submission. In some embodiments, the term vectorizer module generates an output vector based on recognition of one or more words in a set of known words. In some embodiments, a term vectorizer generates a matrix of total counts for one or more words. In some embodiments, words with a frequency higher than a given threshold are not included in the vectorization (e.g., "the," "a," "for," etc.). In some embodiments, the term vectorizer module generates outputs based on stored associations between certain words and certain priority values.

In the illustrated embodiment, a term frequency-inverse data frequency (TF-IDF) vectorizer module processes the summary, description, and comments associated with the user submission. TF-IDF vectorizers are well-understood and the outputs of a TF-IDF vectorizer may reflect the importance of one or more words within a document (e.g., a raw text document may be converted into a matrix of TF-IDF features). For example, the TF-IDF value for a word increases proportionally to the number of times the word appears in the summary, description, and comments associated with the user submission.

In the illustrated embodiment, priority classifier 410 outputs one or more predicted correct priority values for the user submission based on features 420. As discussed above with reference to FIG. 2, one correct priority value or a set of potentially correct priority values may be output by priority classifier 410.

In the illustrated embodiment, categorical encoding module 430 processes correct known priorities for one or more user submissions used as training inputs to generate labels 412 for training the priority classifier 410. In some embodiments, the correct known priorities for one or more user submissions are the priorities assigned to the submission at the time the submission was closed. In some embodiments, the labels 412 generated by module 430 include a first label type (high priorities P0-P2) and a second label type (low priorities P3 and P4). For example, priority classifier 410 may output a priority value P1, which may match a higher priority label type for training purposes.

As discussed above, classifier 410 may be implemented using any of various machine learning classifier types. Further, in some embodiments, classifier 410 implements model stacking in which outputs are generated based on multiple different types of classifiers. This may include combining outputs of multiple types of classifiers (e.g., random forest and boosting) or multiple classifiers of the same type that use different hyper parameters. In some example embodiments, outputs from the following classifiers are combined: two random forest models, two extreme gradient boosting models, two k-nearest neighbors models, two extra tree models, one adaptive boosting model, and one multilayer perceptron model. The duplicate models used in model stacking may be implemented using different hyper parameters. For example, the random forest models may be implemented using 80 estimators and 100 estimators, respectively.

As discussed above, the disclosed combination of inputs, pre-processing, and classifiers discussed with reference to FIG. 4 may advantageously predict priority values accurately for certain issue tracking systems. These details are included for purposes of illustration and are not intended to limit the scope of the present disclosure. Similarly, the inputs and classifiers discussed below with reference to FIGS. 5 and 6 may advantageously provide accurate predictions, but are not intended to limit the scope of the present disclosure. Therefore, in other embodiments, illustrated inputs, pre-processing modules, and/or classifiers may be omitted, additional types may be added, etc.

Example Classification Classifier Module

Figure 5:
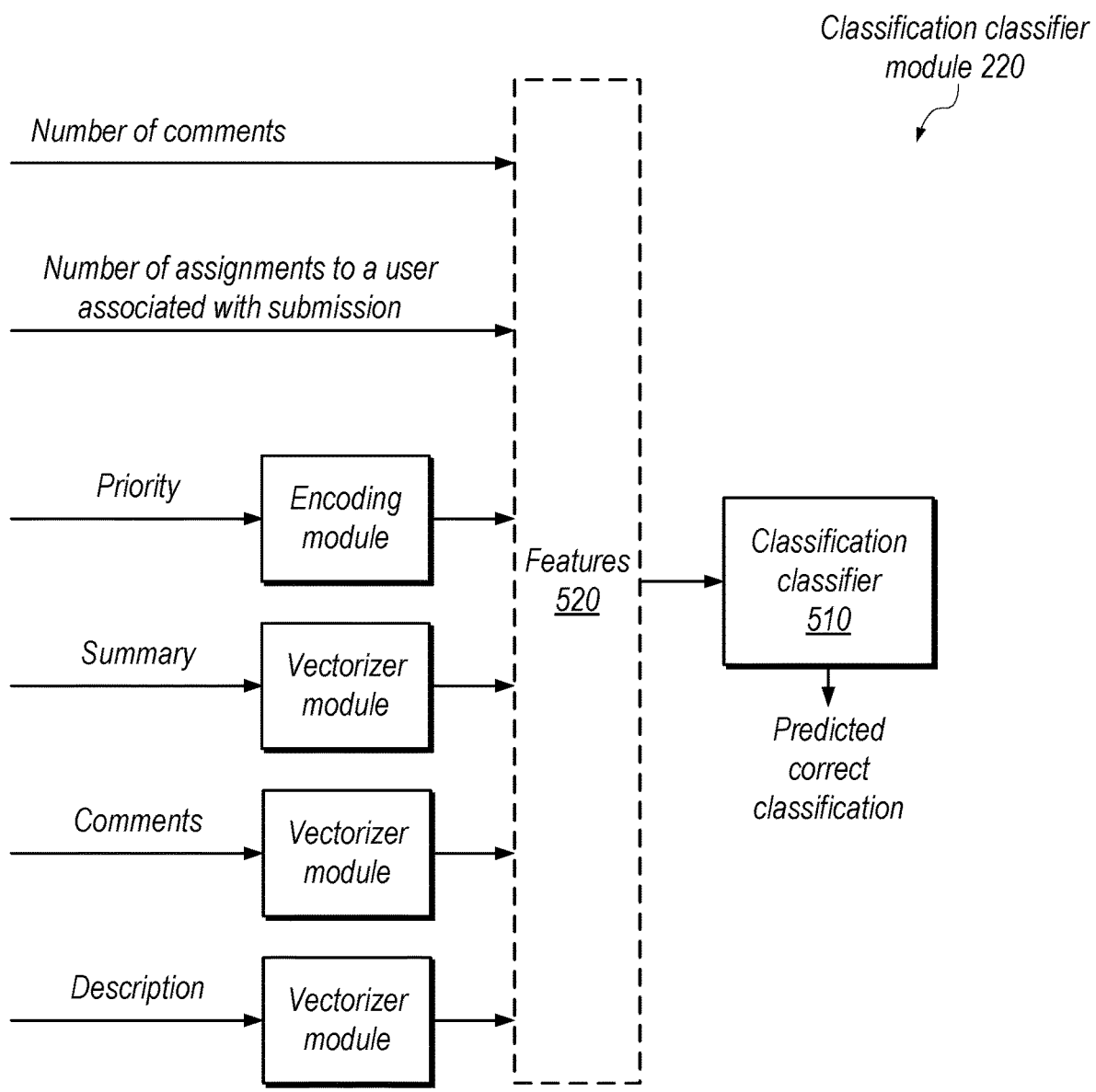
FIG. 5 is a block diagram illustrating example inputs and pre-processing for a classifier for a classification field, according to some embodiments.

FIG. 5 is a block diagram illustrating example inputs and pre-processing for a classifier for a classification field, according to some embodiments. In the illustrated embodiment, classification classifier module 220 includes classification classifier 510 and various pre-processing modules configured to process inputs to generate features 520 for the classification classifier 510.

In the illustrated embodiment, a number of comments and a number of assignments to a user associated with the submission are input directly to classification classifier 510 as features, without pre-processing. In some embodiments, the user associated with the submission is the user who generated the submission (who may be referred to as the reporter). Note that the submission may be re-assigned to the reporter (e.g., to obtain additional details for the submission), potentially multiple times, with the number of times reflected in the input shown in FIG. 5.

In the illustrated embodiment, an encoding module processes a priority input. In some embodiments, the input priority is a value P0-P4. In some embodiments, the priority is one-hot encoded to generate a feature that is input to classification classifier 510. As discussed above with reference to FIG. 4, any of various encoding techniques may be used to pre-process the priority associated with one or more user submissions. Note that inputs shown in the illustrated embodiment, but not explicitly discussed with reference to FIG. 5 may be implemented similarly to similar inputs discussed above with reference to FIG. 4. The various vectorizer modules shown, in the illustrated embodiment, that process summaries, comments, and descriptions associated with one or more user submissions may be similar to the TF-IDF or term vectorizer modules discusses above with reference to FIG. 4 or may be different types of vectorizer modules.

In some embodiments, classification classifier 510 outputs one or more correct predicted classification values for the user submission based on features 520. As discussed above with reference to FIG. 2, one correct classification value or a set of potentially correct classification values may be output by classification classifier 510 using a random forest machine learning engine (e.g., within classification classifier module 220). If these value(s) do not match an actual classification field of an issue, the system may generate a report or automatically adjust the classification field.

Example Assignee Classifier Module

Figure 6:
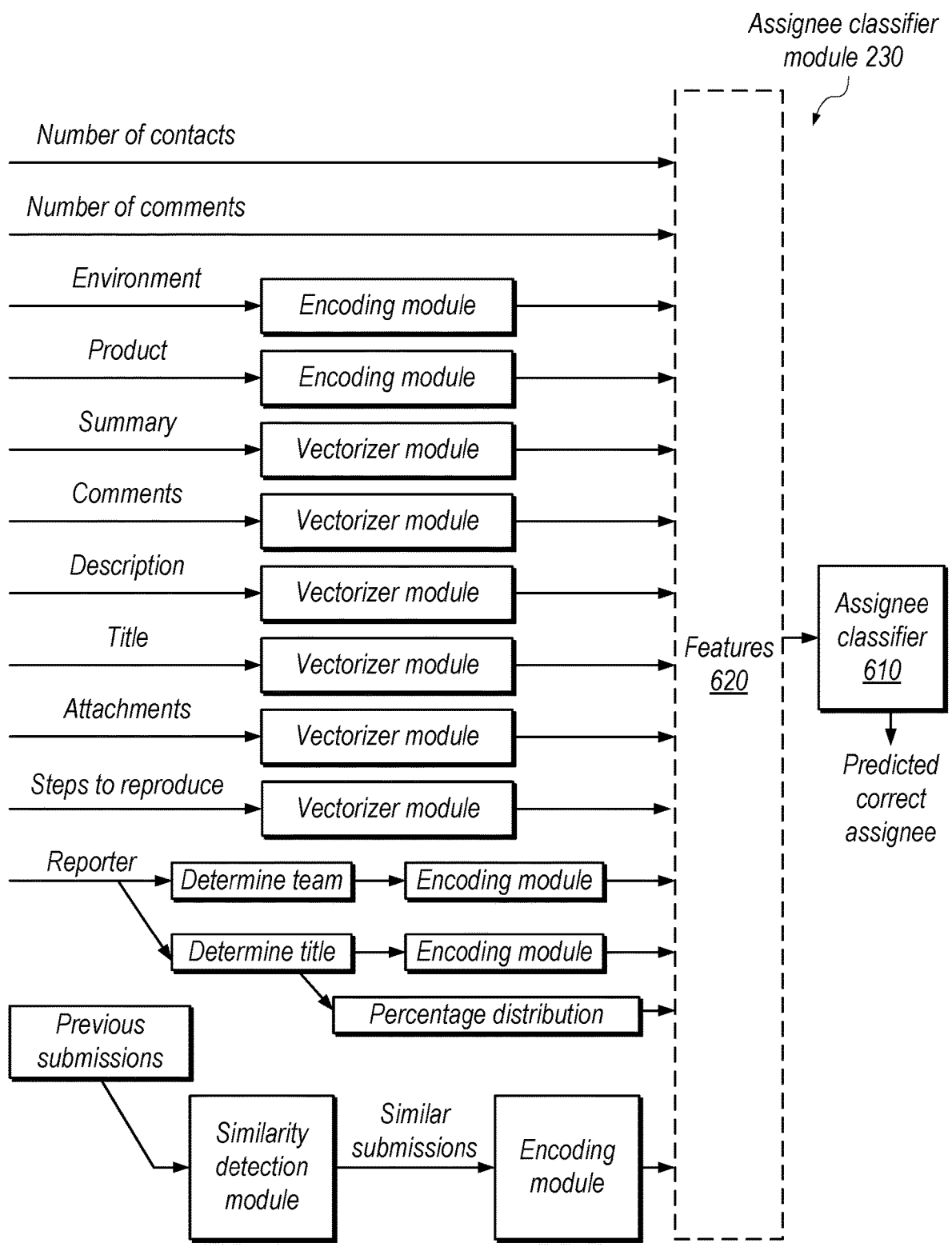
FIG. 6 is a block diagram illustrating example inputs and pre-processing for a classifier for an assignee field, according to some embodiments.

FIG. 6 is a block diagram illustrating example inputs and pre-processing for a classifier for an assignee field, according to some embodiments. In the illustrated embodiment, the assignee classifier module 230 includes assignee classifier 610 and various pre-processing modules configured to process inputs to generate features 620 for classifier 610. In some embodiments, assignee classifier 620 may reduce or eliminate need for manual re-assignments of user submissions (or facilitate faster re-assignments by flagging incorrect assignee fields).

In the illustrated embodiment, a number of contacts attempted for the user submission is input directly to the assignee classifier 610 as a feature 620. In some embodiments, the number of attempted contacts is a numerical representation of an increase in communication volume associated with the user submission.

The encoding modules, in the illustrated embodiment, process environment and product inputs associated with the user submission. The encoding modules used to process these two inputs may be one or more of the types of encoding modules discussed above with reference to FIG. 4.

Note that the product field may describe service or software products as well as physical products.

In the illustrated embodiment, vectorizer modules process the following inputs: summary, comments, description, title, attachments, and steps to reproduce. The vectorizer modules may be one or more of the types of vectorizers discussed above with reference to FIG. 4. In some embodiments, the title is a descriptive entry, e.g., entered by the user creating the submission. In some embodiments, the attachments input to the vectorizer module include one or more files submitted with and/or attached to the user submission. In some embodiments, the steps to reproduce include instructions for recreating an issue encountered by one or more users.

In the illustrated embodiment, a pre-processing module determines a team associated with the reporter. In the illustrated embodiment, the determined team is input to an encoding module. In some embodiments, a team is one or more of the following: customer support, mobile development, merchant support, site reliability, etc.

In the illustrated embodiment, a pre-processing module determines a job title for the reporter of the user submission. In some embodiments, definitions of and relationships between one or more job titles are stored in a title database. In some embodiments, the pre-processing module accesses the title database to determine a job title for the reporter. In the illustrated embodiment, the determined job title is input to an encoding module, which in turn generates a feature by encoding the job title of the reporter of the user submission. In the illustrated embodiment, a percentage distribution module also processes the determined job title. In some embodiments, a job title is one or more of the following: engineer, technical customer support, product manager, development manager, vice president, etc.

In the illustrated embodiment, a similarity detection module processes previous user submissions (e.g., historical assignments for similar issues) by comparing the previous submissions with the current user submission. In some embodiments, processing the previous submissions includes processing the title, description, and product type of the submissions with a TF-IDF vectorizer module. In some embodiments, processing the previous submissions includes using a convolutional neural network on images of the submissions (e.g., images in attachments included with the user submission) to identify similar submissions to the current submission. In some embodiments, processing using a convolutional neural network is performed periodically, for different types of user submissions. In the illustrated embodiment, the similarity detection module outputs identified similar submissions to an encoding module. Note that inputs shown in the illustrated embodiment, but not explicitly discussed may be implemented similarly to similar inputs discussed above with reference to FIG. 4.

As discussed above, classifier 610 may be implemented using any of various machine learning classifier types. Similar to classifier 410, in some embodiments, classifier 610 implements model stacking in which outputs are generated based on multiple different types of classifiers. In some example embodiments, outputs from the following classifiers are combined: a random forest model, an extreme gradient boosting model, and a logistic regression model.

In the illustrated embodiment, assignee classifier 610 outputs one or more correct predicted assignee values for the user submission based on features 620. Note that the combined outputs of priority classifier 410, classification classifier 510, and assignee classifier 610 may advantageously be used to decrease time to resolution of user submissions.

For example, these classifiers may advantageously detect when pertinent fields of user submissions are incorrect, which may avoid delays associated with those incorrect fields. In some embodiments, the outputs of these models (including predicted correct field values and confidence values, in some embodiments) may be combined in various manners, including weighting, model stacking, etc. to determine whether to generate a report or modify one or more field values based on the combination of outputs.

Example Method

Figure 7:
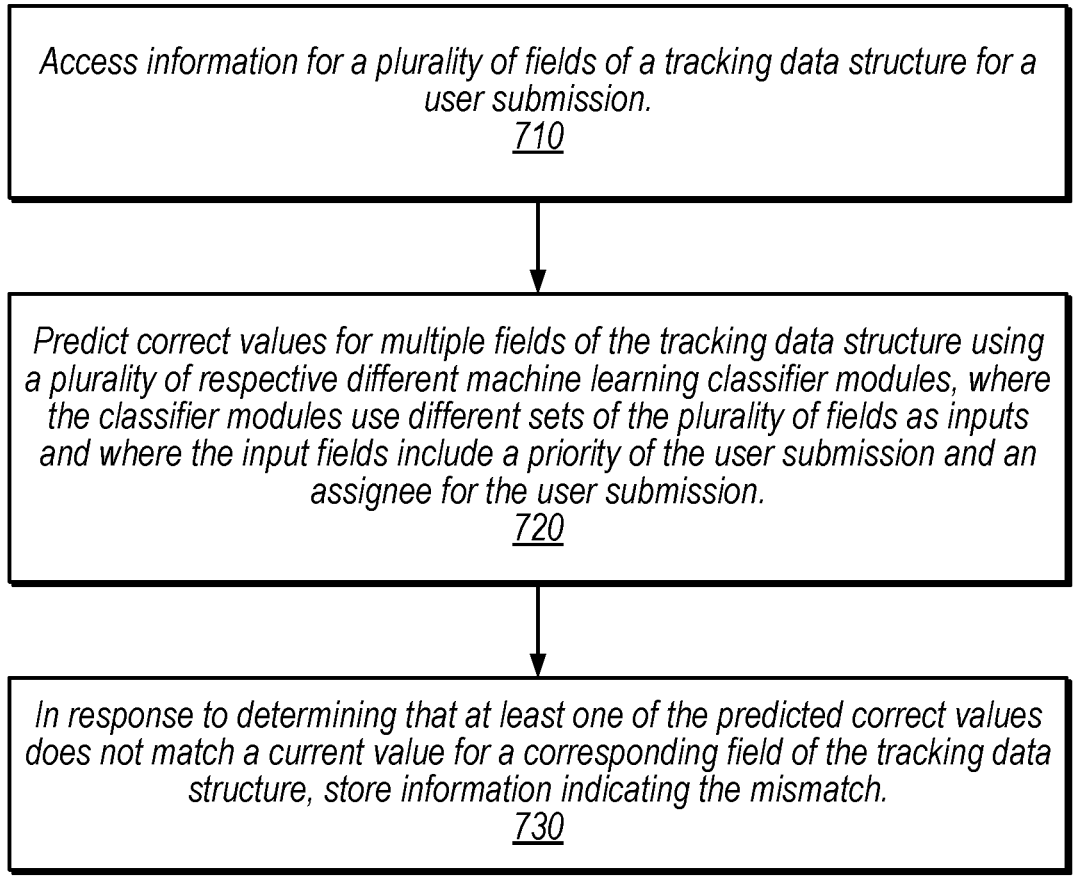
FIG. 7 is a block diagram illustrating a method for generating mismatch information based on comparing predicted correct field values for a tracking data structure and current field values stored in the tracking data structure, according to some embodiments.

FIG. 7 is a block diagram illustrating a method for generating mismatch information based on comparing predicted correct field values for a tracking data structure and current field values stored in the tracking data structure, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a computing system accesses information for a plurality of fields of a tracking data structure for a user submission. Examples of field types are discussed above with reference to FIGS. 4-6.

At 720, in the illustrated embodiment, the computing system predicts correct values for multiple fields of the tracking data structure using a plurality of respective different machine learning classifier modules. In some embodiments, the classifier modules use different sets of the plurality of fields as inputs to the different classifiers. In some embodiments, the multiple fields for which values are predicted include a priority of the user submission and an assignee for the user submission. In some embodiments, the fields that are predicted also include a classification type of the user submission. Note that, in other embodiments, a single classifier may be used to predict a correct value for a single field of the tracking data structure.

In some embodiments, based on the predicting, the computing system automatically updates one or more of the multiple fields of the tracking data structure. In some embodiments, the computing system receives feedback from one or more users associated with the submission, where the feedback is based on the automatic updates. In some embodiments, the computing system trains one or more of the plurality of different machine learning classifier modules, based on the feedback.

In some embodiments, the classifier module that predicts a correct value for the priority of the user submission operates based on the following inputs: a number of comments on the submission, a number of attachments to the submission, a number of labels for the submission, a number of users associated with the submission, a creation time of the submission, activity associated with one or more other related user submissions, and text from the submission. In some embodiments, the classifier module that predicts a correct value for the priority of the user submission further operates based on the following inputs: an environment associated with the submission, a communications medium used to submit the submission, a sub-product line associated with the submission, a country associated with the submission, a project key associated with the submission, and a user that generated the submission.

In some embodiments, the classifier module that predicts a correct value for the priority of the user submission implements model stacking to generate output classifications using multiple random forest models, multiple extreme gradient boosting models, multiple k-nearest neighbors models, multiple extra tree models, at least one adaptive boosting model, and at least one multilayer perceptron model.

In some embodiments, one of the plurality of different machine learning classifier modules is a classification classifier that predicts a correct value for a classification type of the user submission. In some embodiments, the classification classifier operates based on the following inputs: a number of comments, a number of assignments to a user associated with the submission, a priority of the submission, and text from the submission. In some embodiments, the classifier module that predicts a correct value for the assignee of the user submission operates based on the following inputs: text from the submission, an environment associated with the submission, a product type associated with the submission, communication volume associated with the submission, information associated with a user that generated the submission, a number of steps to reproduce activity associated with the submission, and content of one or more attachments associated with the submission.

In some embodiments, one or more outputs of a first classifier module of the plurality of different machine learning classifier modules are used as inputs to at least a second classifier module of the plurality of different classifier modules. In some embodiments, the accessing and the predicting are performed for a plurality of tracking data structures for a plurality of user submissions periodically.

At 730, in the illustrated embodiment, in response to determining that at least one of the predicted correct values does not match a current value for a corresponding field of the tracking data structure, the computing device stores information indicating the mismatch. In some embodiments, the computing system may transmit a report that indicates the mismatch.

In some embodiments, the computing device performs pre-processing on one or more of the plurality of fields input to the classifier module configured to predict a correct value for the priority of the user submission, including: scaling to a standard, encoding, determining a distribution ratio of a field value of the user submission among multiple submissions, or vectorizing text (e.g., vectorizing based on recognized terms or TF-IDF vectorizing).

In some embodiments, predicting a correct assignee value for a user submission may advantageously reduce the number of assignments and/or re-assignments for the user submission. In some embodiments, reducing the number of assignments and/or re-assignments may reduce time to resolution. In some embodiments, predicting a correct classification for a user submission may also improve the time to resolution for the user submission. In some embodiments, predicting a correct priority value for a user submission may improve the accuracy of assignment for the submission (e.g., the submission is assigned to the correct entity) which may advantageously reduce the time to resolution.

Example Computing Device

Figure 8:
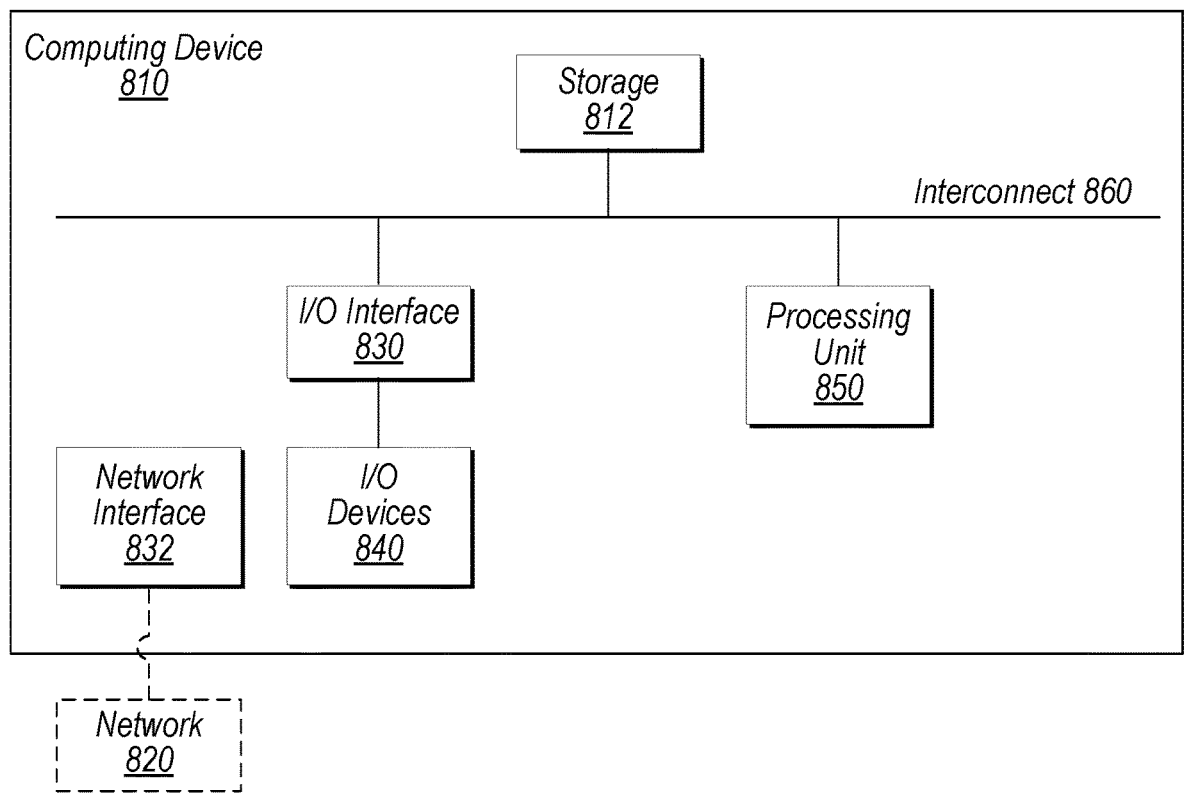
FIG. 8 is a block diagram illustrating an exemplary computing device, according to some embodiments.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   accessing, by a computing system, information for a plurality of fields of a tracking data structure for a user submission;
   predicting, by the computing system based on the information for the plurality of fields, correct values for respective ones of multiple different fields of the tracking data structure, wherein the predicting includes:
      generating, using a first machine learning classifier module based on a first set of fields from the plurality of fields, a correct value for a priority field of the tracking data structure, wherein the first module is trained using one set of tracking data structure fields; and
      generating, using a second, different machine learning classifier module based on a second, different set of fields of the plurality of fields, a correct value for an assignee field of the tracking data structure, wherein the second module is trained using another, different set of tracking data structure fields; and
   in response to determining that at least one of the predicted correct values does not match a current value for a corresponding field of the tracking data structure, storing information indicating the mismatch.

2. The method of claim 1, wherein the multiple fields of the tracking data structure further include: a classification type of the user submission.

3. The method of claim 1, further comprising:
   automatically updating, based on the predicting, one or more of the multiple fields of the tracking data structure.

4. The method of claim 3, further comprising:
   receiving feedback from one or more users associated with the submission, wherein the feedback is based on the automatic updates; and
   training one or more of a plurality of different machine learning classifier modules used to perform the predicting including the first and second machine learning classifier modules, based on the feedback.

5. The method of claim 1, wherein the first machine learning classifier module operates based on inputs that include:
   a creation time of the submission;
   activity associated with one or more other related user submissions; and
   text from the submission.

6. The method of claim 5, wherein the first machine learning classifier module further operates based on inputs that include:
   a programming environment associated with the submission;
   a project key associated with the submission; and
   a user that generated the submission.

7. The method of claim 1, further comprising:
   pre-processing on one or more of the first set of fields input to the first machine learning classifier module configured to predict a correct value for the priority field of the user submission, including:
   vectorizing text;
   scaling to a standard; and
   determining a distribution ratio, among multiple submissions, of a field value of the user submission.

8. The method of claim 1, wherein the first machine learning classifier module that predicts a correct value for the priority field of the user submission implements model stacking to generate output classifications using:
   multiple random forest models;
   multiple extreme gradient boosting models;
   multiple k-nearest neighbors models;
   multiple extra tree models;
   at least one adaptive boosting model; and
   at least one multilayer perceptron model.

9. The method of claim 1, wherein the predicting further includes:
   predicting, using a third machine learning classifier module that predicts a correct value for a classification type of the user submission, and wherein the third machine learning classifier module operates based on inputs that include:
   a number of comments;
   a number of assignments to a user associated with the submission;
   a priority of the submission; and
   text from the submission.

10. The method of claim 1, wherein the second, different machine learning classifier module operates based on inputs that include:
    text from the submission;
    a product type associated with the submission; and
    content of one or more attachments associated with the submission.

11. The method of claim 1, wherein one or more outputs of the first machine learning classifier module are used as inputs to at least the second, different machine learning classifier module.

12. The method of claim 1, wherein the accessing and the predicting are performed for a plurality of tracking data structures for a plurality of user submissions periodically.

13. An apparatus, comprising:
    processor circuitry configured to:
       predict, based on information for a plurality of fields of a tracking data structure for a user submission, correct values for respective ones of multiple different fields of the tracking data structure, wherein the predicting includes:
          generating, using a first machine learning classifier based on a first set of fields from the plurality of fields, a correct value for a first input field of the tracking data structure, wherein the first classifier is trained using one set of tracking data structure fields; and
          generating, using a second, different machine learning classifier based on a second different set of fields of the plurality of fields, a correct value for a second, different input field of the tracking data structure, wherein the second classifier is trained using another, different set of tracking data structure fields; and
       in response to determining that at least one of the predicted correct values does not match a current value for a corresponding field of the tracking data structure, store information indicating the mismatch.

14. The apparatus of claim 13, wherein the first input field is a priority of the user submission and the second input field is an assignee for the user submission.

15. The apparatus of claim 13, wherein the apparatus is further configured to:
automatically update, based on the prediction, one or more of the multiple fields of the tracking data structure.

16. The apparatus of claim 15, wherein the apparatus is further configured to:
receive feedback from one or more users associated with the submission, wherein the feedback is based on the automatic updates; and
train one or more of a plurality of different machine learning classifiers used to perform the predicting including the first and second machine learning classifiers, based on the feedback.

17. A non-transitory computer-readable medium having instructions stored thereon that are executable by a computing system to perform operations comprising:
accessing information for a plurality of fields of a tracking data structure for a user submission;
predicting, based on the information for the plurality of fields, correct values for multiple different fields of the tracking data structure, wherein the predicting includes:
generating, using a first machine learning classifier module based on a first set of fields from the plurality of fields, a correct value for a priority field of the tracking data structure, wherein the first module is trained using one set of tracking data structure fields; and
generating, using a second, different machine learning classifier module based on a second different set of fields of the plurality of fields, a correct value for an assignee field of the tracking data structure, wherein the second module is trained using another, different set of tracking data structure fields; and
in response to determining that at least one of the predicted correct values does not match a current value for a corresponding field of the tracking data structure, storing information indicating the mismatch.

18. The non-transitory computer-readable medium of claim 17, wherein the first machine learning classifier module configured to predict a correct value for the priority field of the user submission operates based on inputs that include:
a number of comments on the submission;
a number of attachments to the submission;
a number of labels for the submission; and
a number of users associated with the submission.

19. The non-transitory computer-readable medium of claim 17, wherein one or more outputs of the first machine learning classifier module are used as inputs to at least the second, different machine learning classifier module.

20. The non-transitory computer-readable medium of claim 17, wherein the accessing and the predicting are performed for a plurality of tracking data structures for a plurality of user submissions periodically.

* * * * *